United States Patent
Blazhiyevskiy et al.

(10) Patent No.: US 12,141,048 B2
(45) Date of Patent: Nov. 12, 2024

(54) MACHINE LEARNING MODEL FOR DETERMINING SOFTWARE DEFECT CRITICALITY

(71) Applicant: ServiceNow, Inc., Santa Clara, CA (US)

(72) Inventors: Andriy Blazhiyevskiy, Santa Clara, CA (US); Eric Augustine Robison, Santa Clara, CA (US); Yijun Liu, San Diego, CA (US); Deependra Singh Jhala, Kirkland, WA (US); Eugene Vikutan, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 104 days.

(21) Appl. No.: 17/964,237

(22) Filed: Oct. 12, 2022

(65) Prior Publication Data
US 2024/0126678 A1    Apr. 18, 2024

(51) Int. Cl.
*G06F 11/36* (2006.01)

(52) U.S. Cl.
CPC .................. *G06F 11/3636* (2013.01)

(58) Field of Classification Search
CPC .................................. G06F 11/3636
See application file for complete search history.

(56) References Cited

U.S. PATENT DOCUMENTS

| | | |
|---|---|---|
| 4,941,084 A | 7/1990 | Terada et al. |
| 5,185,860 A | 2/1993 | Wu |
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |

(Continued)

FOREIGN PATENT DOCUMENTS

| | | |
|---|---|---|
| EP | 0433979 | 6/1991 |
| EP | 1607824 | 12/2005 |

(Continued)

*Primary Examiner* — Douglas M Slachta
(74) *Attorney, Agent, or Firm* — McDonnell Boehnen Hulbert & Berghoff LLP

(57) ABSTRACT

A system includes a processor configured to perform operations, including determining, for each respective software defect of software defects identified in a software product, corresponding attribute values that represent a software development history of the respective software defect, and determining, for each respective defect, using a machine learning model, and based on the corresponding attribute values, a corresponding escalation value representing a likelihood of the respective defect being escalated for resolution after release of the software product. The machine learning model may have been trained using corresponding software development histories of training defects that were escalated for resolution after release of a prior version of the software product. The operations also include, based on the corresponding escalation value of each respective defect, selecting, for resolution prior to the release of the software product, a defect subset of the software defects, and storing a representation of the defect subset.

20 Claims, 9 Drawing Sheets

(56) References Cited

U.S. PATENT DOCUMENTS

| | | |
|---|---|---|
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,477,471 B1 * | 11/2002 | Hedstrom ............ G06F 11/3616 703/22 |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,038,030 B2 * | 5/2015 | Rama .................... G06F 11/008 717/124 |
| 9,053,460 B2 | 6/2015 | Gilbert et al. |
| 9,372,747 B2 * | 6/2016 | Bird .................... G06F 11/3495 |
| 10,354,210 B2 * | 7/2019 | Kour .................... G06Q 10/06313 |
| 10,459,695 B2 * | 10/2019 | Hauser ................ G06F 11/362 |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,944,654 B2 | 3/2021 | Rimar et al. |
| 11,003,568 B2 * | 5/2021 | Smith .................. G06F 11/0793 |
| 11,089,115 B2 | 8/2021 | Garty et al. |
| 11,095,506 B1 | 8/2021 | Erblat et al. |
| 11,334,351 B1 * | 5/2022 | Pandurangarao ... G06F 11/3676 |
| 11,580,009 B2 * | 2/2023 | Plawecki ............ G06F 11/3664 |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0180429 A1 * | 8/2007 | Gogh .................. G06F 11/3604 717/126 |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2011/0321007 A1 * | 12/2011 | Marum .................... G06F 8/65 717/124 |
| 2013/0152047 A1 * | 6/2013 | Moorthi ............... G06F 11/3664 717/124 |
| 2015/0100940 A1 * | 4/2015 | Mockus .................... G06F 8/70 717/101 |
| 2016/0306627 A1 * | 10/2016 | Hewitt ...................... G06F 8/73 |
| 2016/0307133 A1 * | 10/2016 | Kour ................ G06Q 10/06313 |
| 2018/0123940 A1 | 5/2018 | Rimar et al. |
| 2019/0104398 A1 | 4/2019 | Owen et al. |
| 2019/0138629 A1 * | 5/2019 | Kurian .................... G06F 16/27 |
| 2019/0324778 A1 * | 10/2019 | Bhowmick ............ G06F 9/453 |
| 2020/0050689 A1 | 2/2020 | Tal et al. |
| 2020/0204443 A1 | 6/2020 | Bar Oz et al. |
| 2021/0194764 A1 | 6/2021 | Badyan et al. |
| 2021/0208855 A1 * | 7/2021 | Zhang ...................... G06F 8/36 |
| 2021/0303389 A1 * | 9/2021 | Gadi ...................... G06N 3/08 |
| 2022/0029886 A1 | 1/2022 | Hameiri et al. |
| 2022/0180290 A1 * | 6/2022 | Xin .......................... G06F 40/40 |
| 2023/0169175 A1 * | 6/2023 | Ananthapur .......... G06F 21/577 726/25 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

\* cited by examiner

MACHINE LEARNING MODEL FOR DETERMINING SOFTWARE DEFECT CRITICALITY

BACKGROUND

A software defect is and/or results from an error in coding of a software product, and causes incorrect and/or unexpected behavior of the software product that might not meet requirements of the software product. Software defects are often referred to as software bugs. Software defects may vary in severity and likelihood of occurrence. Accordingly, some software defects may be more problematic than others. Thus, since it might not be possible and/or practical to resolve all software defects, it may be desirable to prioritize resolution of software defects that are likely to be relatively more problematic (e.g., to software product end-users), while deprioritizing software defects that are likely to be relatively less problematic.

SUMMARY

It is generally desirable to resolve (i.e., fix) software defects of a software product prior to release of the software product. In practice, however, it might not be possible to resolve all known software defects prior to release of the software product due to, for example, limited time and/or developer resources. Accordingly, to reduce or minimize the number of software defects that are escalated for resolution (e.g., by end-users) after release of the software product, it is desirable to first resolve the most severe software defects (e.g., defects that are most likely to have a most significant impact on the end users' operations) and subsequently resolve the less severe software defects. However, it may be difficult to manually and/or heuristically predict and/or estimate the likelihood of escalation of different software defects, especially in the context of a software product with a large codebase.

Accordingly, a machine learning (ML) model may be trained, using past software defect escalations from prior versions of a software product, to predict the respective likelihoods of escalation for a plurality of software defects identified in a current version of the software product. Because both the training data and the inference data is obtained from the same software product (albeit from different versions/releases thereof), the machine learning model may learn software-specific factors that affect post-release escalation and may thus be more accurate with respect to that software product. In some implementations, the machine learning model may additionally be trained using past software defect escalations of other software applications, thus allowing the ML model to learn based on defect escalations across different software products.

The machine learning model may be configured to generate, for each respective software defect of a plurality of software defects identified in a current version of the software product, a corresponding escalation value based on corresponding attribute values of the respective software defect. The corresponding escalation value may indicate a likelihood of an end-user encountering the respective software defect after release of the software product and requesting that the respective software defect be fixed.

Each respective software defect may be associated with a corresponding feature of the software product, where the corresponding feature contains, includes, and/or is affected by the respective software defect. The corresponding attribute values associated with the respective software defect may represent a software development history associated with the respective software defect. Thus, the corresponding attribute values may contain information that is interpretable by the machine learning model to determine the likelihood of future escalations.

The corresponding attribute values may include a number of lines of code and/or a number of files that have been modified in the corresponding feature, a number of revision control commits made to the corresponding feature, information about plugins utilized by the corresponding feature, a product area to which the corresponding feature belongs, a textual description of the respective software defect, a textual description of the corresponding feature, source code comments included in source code that defines the corresponding feature, and/or identifiers of software developers involved in programming the corresponding software feature, among other possibilities.

The corresponding escalation value generated by the machine learning model for each respective software defect may be used to classify the respective software defect as likely or unlikely to be escalated, and/or to rank the likelihood of escalation of the respective software defect relative to the respective likelihood of escalation of other software defects. Accordingly, the output of the machine learning model may assist software developers with determining which defects to address before release and/or the order in which to address these defects (e.g., to prioritize defects most likely to be escalated).

Accordingly, a first example embodiment may involve a system that includes persistent storage containing a plurality of representations of a plurality of software defects identified in a software product, and one or more processors configured to perform operations. The operations may include determining, for each respective software defect of the plurality of software defects, a corresponding one or more attribute values that represent a software development history associated with the respective software defect. The operations may also include determining, for each respective software defect of the plurality of software defects, using a machine learning model, and based on the corresponding one or more attribute values, a corresponding escalation value representing a likelihood of the respective software defect being escalated for resolution after release of the software product. The machine learning model may have been trained using corresponding software development histories of a plurality of training software defects that were escalated for resolution after release of one or more prior versions of the software product. The operations may additionally include, based on the corresponding escalation value of each respective software defect, selecting, for resolution prior to the release of the software product, a defect subset that includes one or more software defects of the plurality of software defects. The operations may further include storing a representation of the defect subset in the persistent storage.

A second example embodiment may involve determining, for each respective software defect of a plurality of software defects identified in a software product, a corresponding one or more attribute values that represent a software development history associated with the respective software defect. Persistent storage may contain a plurality of representations of the plurality of software defects. The second example embodiment may also involve determining, for each respective software defect of the plurality of software defects, using a machine learning model, and based on the corresponding one or more attribute values, a corresponding escalation value representing a likelihood of the respective software defect being escalated for resolution after release of the software product. The machine learning model may have been trained using corresponding software development histories of a plurality of training software defects that were escalated for resolution after release of one or more prior versions of the software product. The second example embodiment may additionally involve, based on the corresponding escalation value of each respective software defect, selecting, for resolution prior to the release of the software product, a defect subset that includes one or more software defects of the plurality of software defects. The second example embodiment may further involve storing a representation of the defect subset in the persistent storage.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
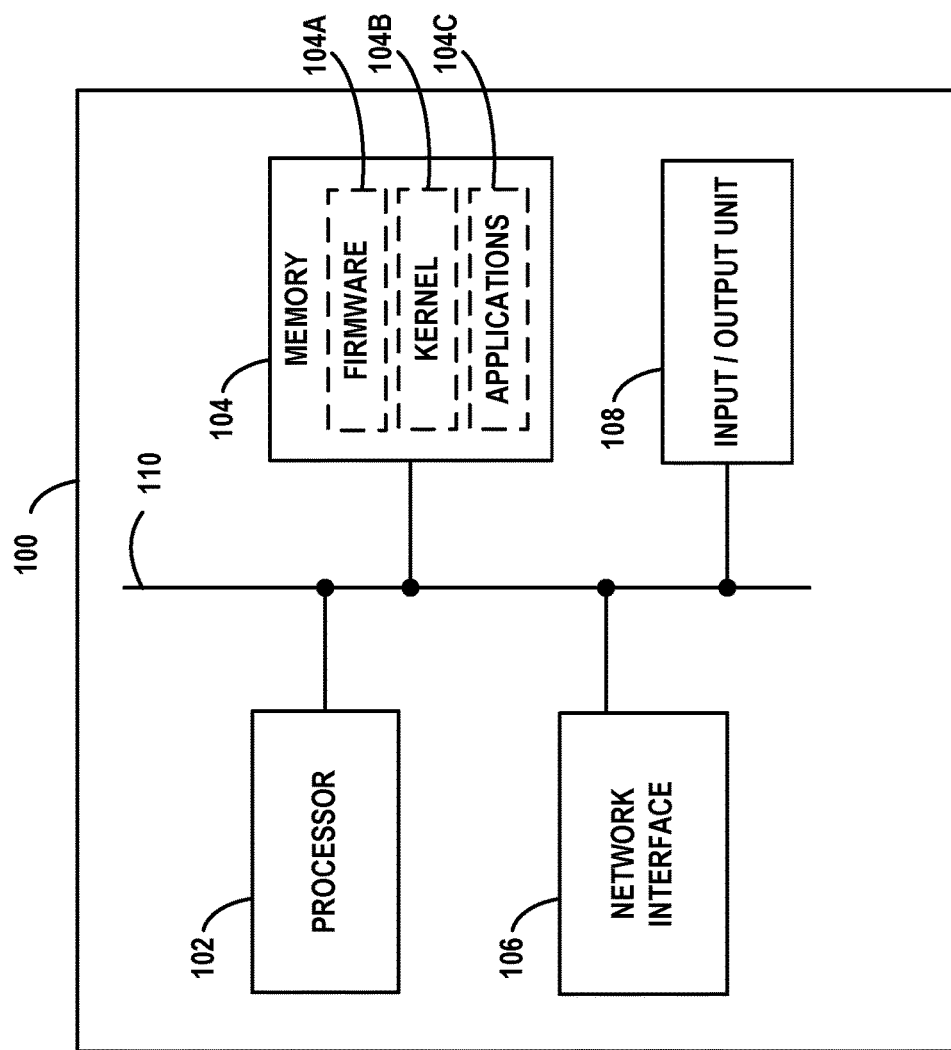
FIG. 1 illustrates a schematic drawing of a computing device, in accordance with example embodiments.

Example methods, devices, and systems are described herein. It should be understood that the words "example"
and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
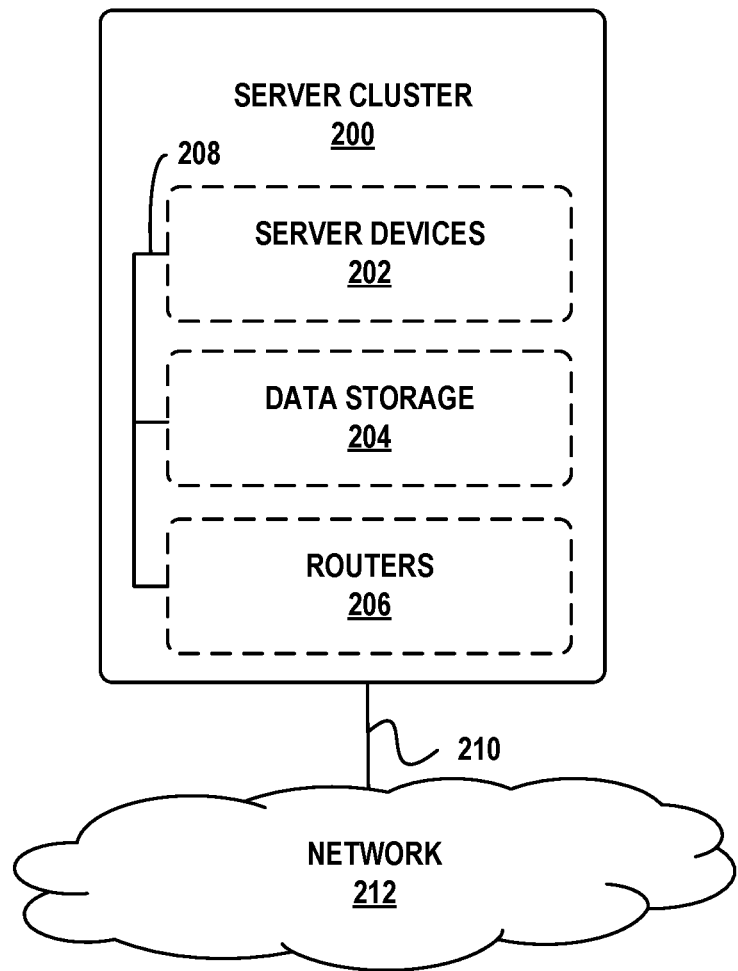
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the eXtensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
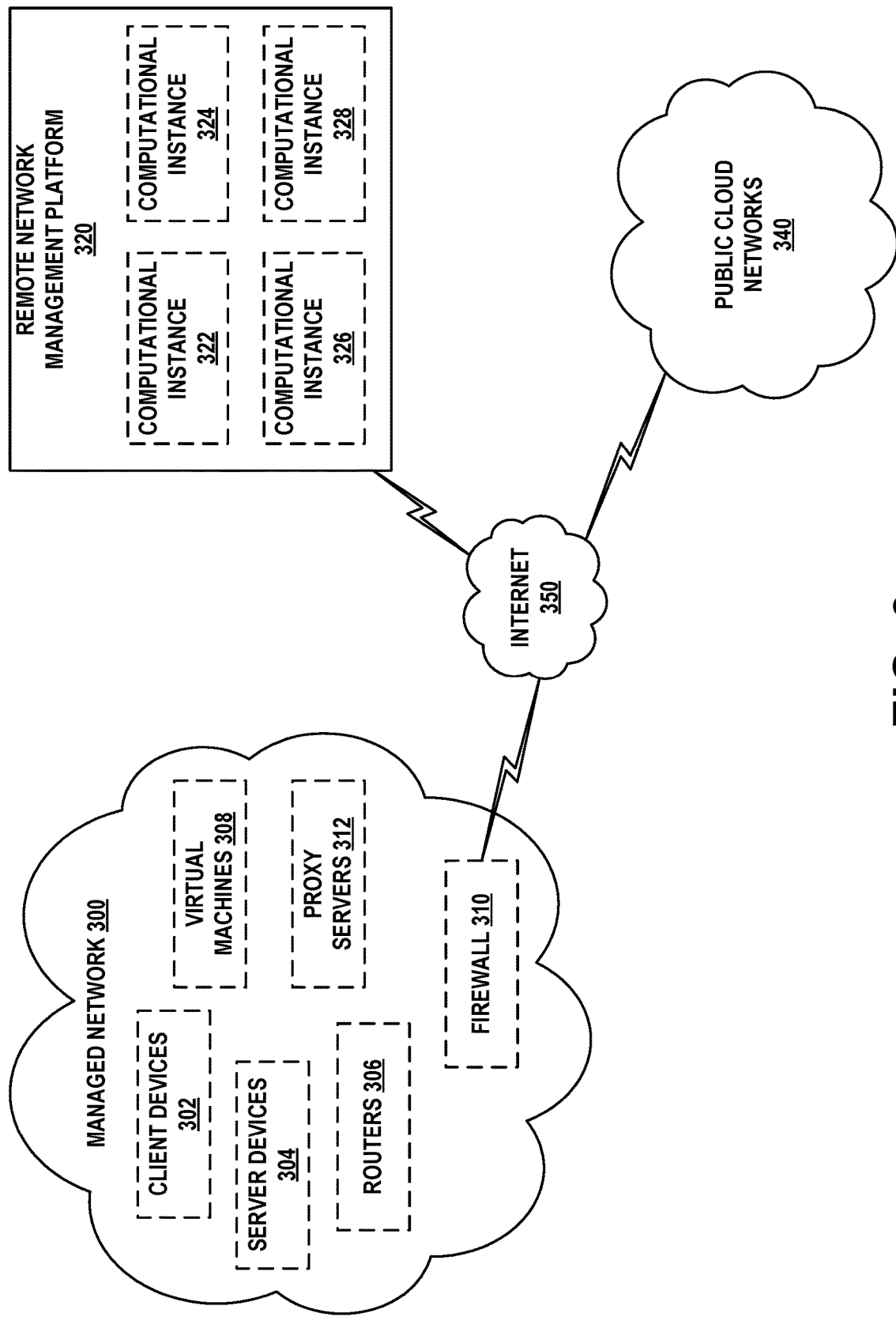
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
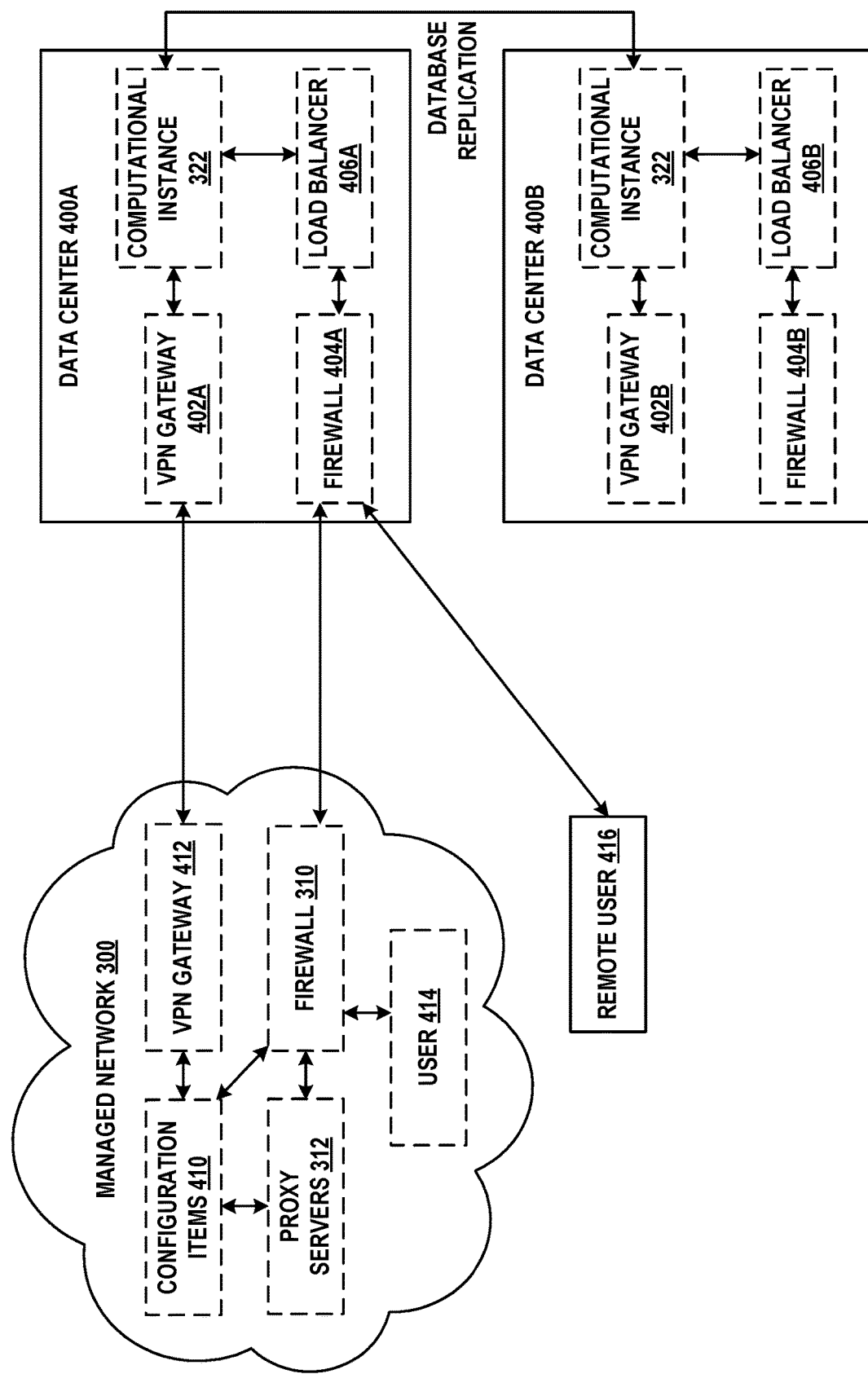
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. EXAMPLE DISCOVERY

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
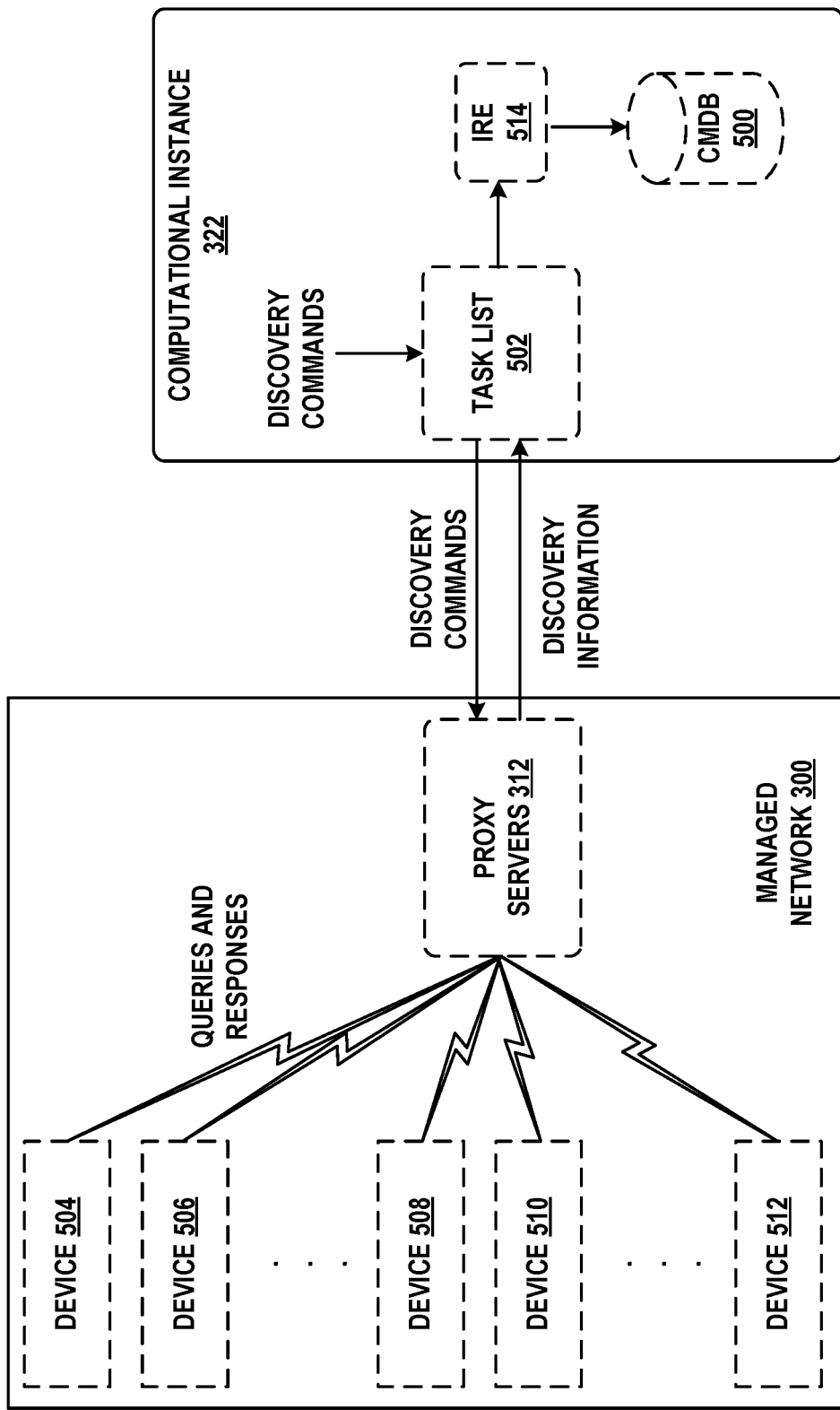
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery—horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases—under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB IDENTIFICATION RULES AND RECONCILIATION

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. EXAMPLE DEFECT CRITICALITY SYSTEM

A software product may include a plurality of software defects, which are sometimes referred to as software bugs. At least some of these software defects may be identified by testing the software product prior to releasing the software product to one or more users. For example, the software defects may be identified in a development, quality assurance, and/or staging environment, and prior to placing the software product in a production environment. In some cases, it may be possible to resolve some, but not all, of the identified software defects prior to release of the software product due to, for example, insufficient time prior to the release and/or an insufficient number of available software developers, among other factors. Accordingly, it is beneficial to identify and resolve software defects in an order based on the criticality, or likelihood of post-release escalation, of each of the identified software defects, to thereby reduce or minimize the number of defects escalated for resolution after release of the software product.

Figure 6:
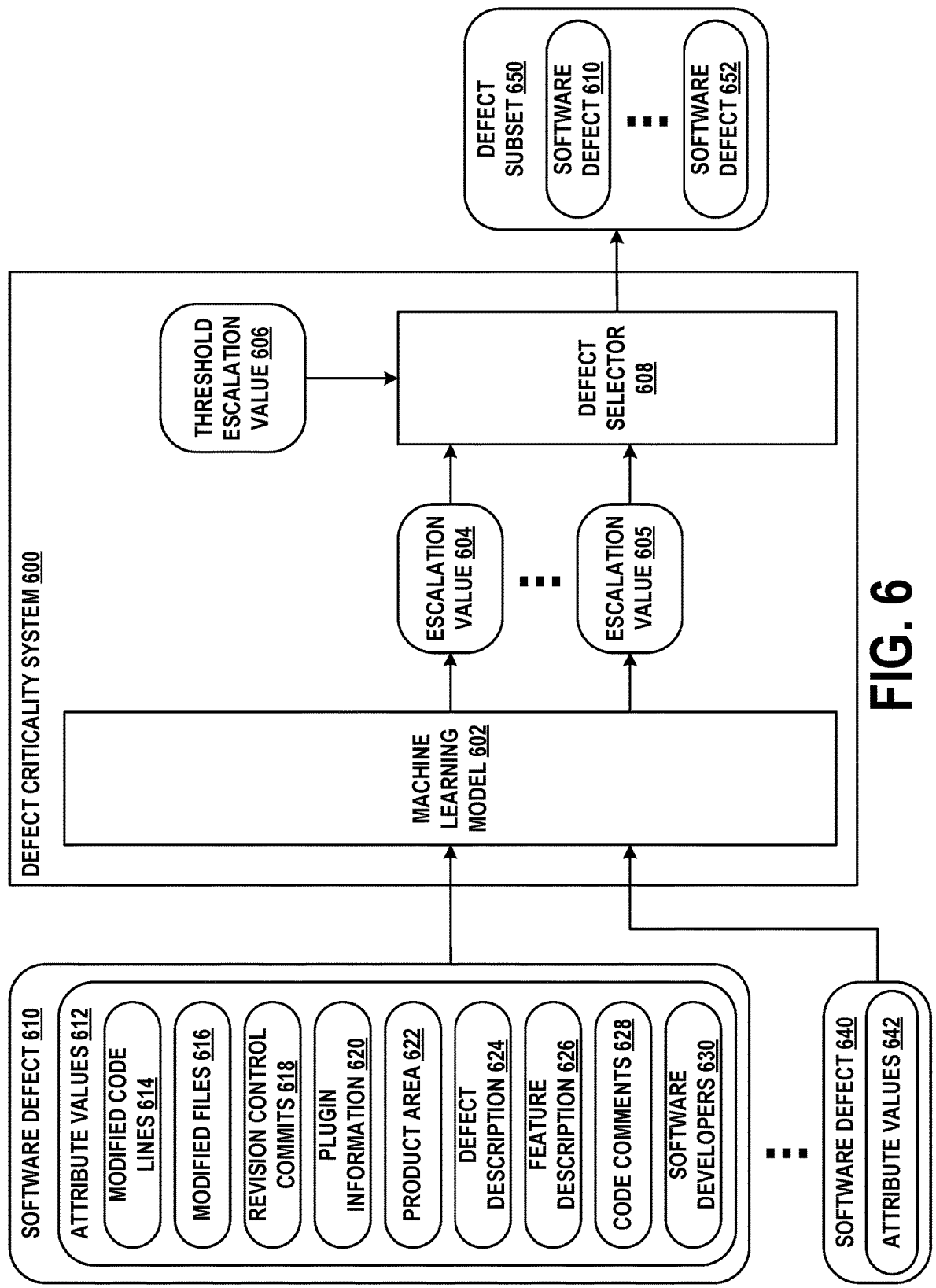
FIG. 6 depicts a defect criticality system, in accordance with example embodiments.

FIG. 6 illustrates a system for determining a criticality of a software defect based on a software development history associated therewith. Specifically, defect criticality system 600 may include machine learning model 602 and defect selector 608. Defect criticality system 600 may be configured to select, from software defect 610 through software defect 640 (i.e., software defects 610-640) and based on respective attribute values 612-642 thereof, defect subset 650. Defect subset 650 may include software defect 610 through software defect 652 (i.e., software defects 610-652) that are predicted, with at least a threshold likelihood and/or confidence, to be escalated for resolution after release of a version of the software product in which these defects are found.

Software defects 610-640 may represent software defects that have been detected in a particular version (e.g., a current, or most recent version) of the software product, and may thus represent candidates for resolution prior to release of the particular version of the software product. In some cases, it might not be possible to resolve all of software defects 610-640 prior to the release. Additionally, the severity of each respective software defect of software defects 610-640 (e.g., extent of adverse consequences associated with releasing the particular version of the software product without resolving the respective software defect) may vary, and thus resolving some of software defects 610-640 may be more beneficial than resolving others.

Each respective software defect of software defects 610-640 may be associated with a corresponding set of one or more attribute values that represent a software development history associated with the respective software defect. Thus, software defect 610 may be associated with attribute values 612, software defect 640 may be associated with attribute values 642, and other software defects, as indicated by the ellipsis, may be associated with corresponding other attribute values. The corresponding set of one or more attribute values may contain information that is useful in determining how likely the respective software defect is to be escalated post-release.

Each respective software defect of software defects 610-640 may be associated with at least one corresponding feature of the software product. Specifically, the software product may be formed by a plurality of features, each of which may represent a corresponding set of software instructions configured to perform particular function(s)/operation(s) within the software product. The plurality of features may be defined manually during the software development process, and/or may be determined based on a structure of the software instructions that form the software product, among other possibilities.

In one example, the respective software defect may be mapped to the corresponding feature of the software product based on the software defect being identified by a software test configured to evaluate performance of the corresponding feature of the software product. In another example, the respective software defect may be manually mapped to the corresponding feature of the software product by a software developer and/or a software tester. In a further example, the respective software defect may be mapped to the corresponding feature of the software product based on the software defect being identified in a file (e.g., source code file, executable file, etc.) associated with the corresponding feature of the software product.

Thus, the software development history associated with the respective software defect may represent the development of the corresponding feature of the software product. Additionally or alternatively, the software development history associated with the software product may represent one or more attempted resolutions that have been tried to resolve the respective software defect. Accordingly, in general, the software development history may include any attribute values that are related to the software defect and/or the software instructions with which the software defect is associated.

Attribute values 612 may include modified code lines 614, modified files 616, revision control commits 618, plugin information 620, product area 622, defect description 624, feature description 626, code comments 628, and software developers 630, among other possible attributes. Other ones of attribute values 612-642 may include corresponding values for the same or similar set of attributes.

Modified code lines 614 may represent a number of lines of source code that have been added to and/or modified in source code associated with the corresponding feature of the software product that contains software defect 610. Modified files 616 may represent a number of source code files that have been added to and/or modified in connection with the corresponding feature of the software product that contains software defect 610. Revision control commits 618 may represent a number of changes that have been committed to the source code associated with the corresponding feature of the software product that contains software defect 610. Each of modified code lines 614, modified files 616, and revision control commits 618 may thus quantify an extent of source code changes made to define the corresponding feature of the software product and/or attempt to resolve software defect 610.

Plugin information 620 may represent one or more plugins used by the corresponding feature of the software product that contains software defect 610. In one example, the one or more plugins may be represented using textual data. In another example, each of a plurality of possible plugins may be assigned a corresponding numerical value, and each of the one or more plugins may thus be represented using the corresponding numerical value thereof. For example, some plugins may, when utilized by other software, be more likely to cause a defect than other plugins.

Product area 622 may represent one or more predefined product areas to which the software product, and/or the corresponding feature of the software product that contains software defect 610, belongs. In one example, the one or more predefined product areas may be represented using textual data. In another example, each of a plurality of predefined product areas may be assigned a corresponding numerical value, and each of the one or more predefined product areas may thus be represented using the corresponding numerical value thereof. For example, some product areas (e.g., security-related product areas) may be more likely to result in escalation of defects than other product areas (e.g., user-interface-related product areas).

Defect description 624 may include textual data that describes software defect 610, including any errors generated during testing, a manner in which the software defect causes the corresponding software feature to behave differently from an intended/expected behavior thereof, and/or suggested resolutions, among other possibilities. Defect description 624 may also include a numerical and/or textual representation of a severity assigned to software defect 610 by an automated test and/or a software tester. Feature description 626 may include textual data that describes the corresponding feature of the software product that contains software defect 610, including the intended/expected behavior thereof.

Defect description 624 and/or feature description 626 may be obtained from formal records generated by software developers/testers as part of formal software development processes, and/or informal communications (e.g., emails, chats, etc.) exchanged among software developers/testers during development and/or testing of the corresponding feature of the software product. In general, defect description 624 and feature description 626 may include any text that describes and/or otherwise relates to, respectively, software defect 610 and the corresponding feature of the software product.

Code comments 628 may include textual data that represents one or more human-readable comments included by software developers in source code associated with the corresponding feature of the software product that contains software defect 610. Thus, code comments 628 may include any textual data that is (i) found in source code associated with the corresponding feature and (ii) delineated by one or more predetermined programming language-specific characters. Code comments 628 may thus include any textual data that is configured to be ignored by a compiler, but may provide useful ML-interpretable information about the corresponding feature and/or software defect 610.

Software developers 630 may represent one or more software developers associated with developing and/or testing the corresponding feature of the software product that contains software defect 610. Since the skill level may vary among different software developers, with some software developers being more likely to introduce a critical software defect into the software product, software developers 630 may be indicative of the skill level with which the corresponding feature of the software product has been developed and/or with which resolution of software defect 610 has been attempted. In one example, the one or more software developers may be represented using textual data. In another example, each of a plurality of software developers may be assigned a corresponding numerical value, and each of the one or more software developers may thus be represented using the corresponding numerical value thereof.

In some implementations, attribute values 612 may be determined by comparing (i) a current version of the feature of the software product to (ii) a prior version of the feature (if any) in a previously released version (e.g., a version immediately preceding the current version) of the software product. Thus, for example, attribute values 612 may represent changes made to the corresponding feature of the software product since a prior working version of the corresponding feature has been released. Additionally or alternatively, attribute values 612 may represent an addition of a new feature to the software product since the previously released version of the software product. In general, the period of time with respect to which attribute values 612 are collected and/or measured may be a modifiable and/or user-selectable parameter.

Machine learning model 602 may be configured to generate, for each respective software defect of software defects 610-640, a corresponding escalation value representing a likelihood of the respective software defect being escalated for resolution after release of the software product. The corresponding escalation value may represent a criticality of the respective software defect, and thus be indicative of a priority and/or urgency with which the respective software defect is to be resolved. Specifically, machine learning model 602 may be configured to generate escalation value 604 corresponding to software defect 610 based on attribute values 612, escalation value 605 corresponding software defect 640 based on attribute values 642, and other escalation values (as indicated by the ellipsis) corresponding to other software defects based on corresponding attribute values thereof.

Machine learning model 602 may be trained to identify and consider linear and/or non-linear effects on escalation values due to various combinations of attribute values. Thus, as one example, machine learning model 602 may learn that a particular software developer rarely introduces software defects in a first product area, but often introduces software defects in a second different product area. As another example, machine learning model 602 may learn that defect and/or feature descriptions are better at predicting escalations for heavily modified features rather than features where only a few lines of code and/or files have been modified. Machine learning model 602 may thus be trained to identify and consider patterns that might be difficult and/or impractical for a human to identify.

Machine learning model 602 may include any machine learning architecture that can be configured to generate (and/or the output of which could be used to generate), based on the corresponding attribute values of a respective software defect, a discrete or continuous escalation value. For example, machine learning model 602 may include a logistic regression model, an artificial neural network (ANN), a decision tree, and/or a support vector machine (SVM), among other possibilities. Since at least some of attribute values 612 may include textual data, machine learning model 602 may include a text embedding model (e.g., a Bidirectional Encoder Representations from Transformers (BERT) model) configured to generate a numerical representation of the textual data, such as a word vector, sentence vector, and/or paragraph vector, among other possibilities.

Defect selector 608 may be configured to determine defect subset 650 based on escalation values 604-605 and, in some cases, based additionally on threshold escalation value 606. Specifically, defect selector 608 may be configured to select defect subset 650 from software defects 610-640 based on escalation values 604-605. Thus, defect subset 650 may include known software defects that, according to defect criticality system 600, should be addressed prior to release of the software product. Defect subset 650 may include, for example, software defect 610 through software defect 652 (i.e., software defects 610-652), each of which may be selected from software defects 610-640 and may thus represent a subset thereof. Defect subset 650 may include, for each of software defects 610-652, the corresponding escalation value.

Threshold escalation value 606 may be a predefined and/or modifiable value that separates critical software defects from non-critical software defects. Specifically, a software defect associated with an escalation value that is equal to or exceeds threshold escalation value 606 may be considered critical, and may thus be added to defect subset 650 by defect selector 608. A software defect associated with an escalation value that is lower than threshold escalation value 606 may be considered non-critical, and may thus be omitted from defect subset 650 by defect selector 608. Thus, threshold escalation value 606 may be increased to reduce a number of software defects in defect subset 650, or decreased to increase the number of software defects in defect subset 650.

In some implementations, defect selector 608 may be additionally configured to rank the software defects of defect subset 650 according to their corresponding escalation values. Thus, defect subset 650 may define an ordered list of software defects 610-652. For example, a software defect associated with a highest corresponding escalation value may be ranked highest, and thus placed first in the ordered list of defect subset 650, while a software defect associated with a lowest corresponding escalation value may be ranked lowest, and thus placed last in the ordered list of defect subset 650. Accordingly, defect subset 650 may indicate a recommended order in which to resolve software defects 610-652, such that the most critical software defects are resolved first, and the least critical software defects are resolved last, thereby improving and/or optimizing allocation of developer resources.

In some implementations, defect selector 608 may operate independently of threshold escalation value 606. Specifically, defect selector 608 may be configured to rank software defects 610-640, but might not select a subset thereof. Thus, defect subset 650 may include an ordered list of software defects 610-640 arranged according to escalation values 604-605.

VII. EXAMPLE TRAINING AND INFERENCE DATA

Figure 7:
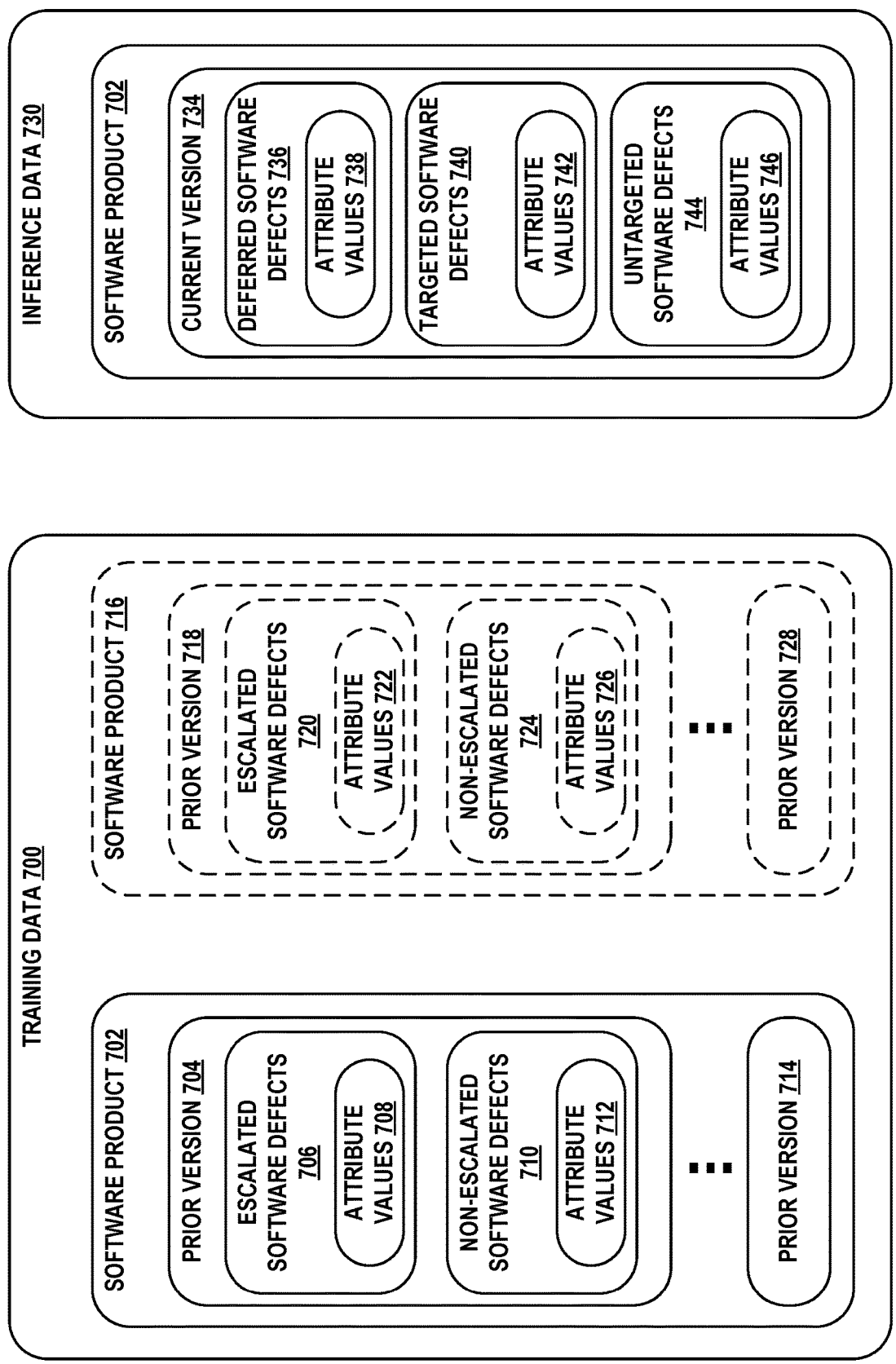
FIG. 7 depicts training data and inference data, in accordance with example embodiments.

FIG. 7 illustrates examples of training data that may be used to train machine learning model 602, and corresponding inference data based on which machine learning model 602 may be used to make predictions. Specifically, training data 700 may include training samples collected from prior versions of software product 702, including prior version 704 through prior version 714 (i.e., prior versions 704-714). Inference data 730 may include inference samples collected from current version 734 of software product 702. In some implementations, training data 700 may also include training samples collected from prior versions of software product 716 (that is different from software product 702), including prior version 718 through prior version 728 (i.e., prior versions 718-728).

In one example, software product 702 may represent software executed by remote network management platform 320 and/or computational instances (e.g., 322, 324, 326, and 328) provided thereby. Thus, prior versions 704-714 may represent aspects of prior implementations of the software provided by remote network management platform 320 and/or the computational instances thereof.

Each respective prior version of a software product may be associated with a corresponding set of one or more escalated software defects that were escalated (e.g., by one or more users) for resolution after release of the respective prior version, and a corresponding set of one or more non-escalated software defects that were not escalated for resolution after release of the respective prior version. For example, prior version 704 of software product 702 may be associated with escalated software defects 706 and non-escalated software defects 710. Escalated software defects 706 may be associated with attribute values 708, and non-escalated software defects 710 may be associated with attribute values 712. Other prior versions of software product 702, including prior version 714, may also be associated with corresponding sets of escalated and non-escalated software defects, each of which is associated with corresponding attribute values.

Prior version 718 of software product 716 may be associated with escalated software defects 720 and non-escalated software defects 724. Escalated software defects 720 may be associated with attribute values 722, and non-escalated software defects 724 may be associated with attribute values 726. Other prior versions of software product 716, including prior version 728, may also be associated with corresponding sets of escalated and non-escalated software defects, each of which is associated with corresponding attribute values.

Attribute values 708, 712, 722, and 726 may each include values for some or all of the same attributes as attribute values 612 (and attribute values 738, 742, and 746). That is, machine learning model 602 may be trained using the same attributes that are expected to be and/or are actually available at inference time. Attribute values 708 and 722 may indicate properties of software defects that were escalated after release of the corresponding software product, while attribute values 712 and 726 may indicate properties of software defects that were not escalated after release of the corresponding software product.

By training machine learning model 602 using training samples specific to software product 702, the accuracy of predictions generated by machine learning model 602 with respect to software product 702 may be improved, since machine learning model 602 may be able to learn software-specific factors that affect defect escalation rates. Specifically, in some cases, the predictive potential of some attribute values (e.g., code comments 628, software developers 630) may be higher in the context of different versions of the same software product than across different software products, since these attribute values are likely to contain similar information.

Further, by additionally training machine learning model 602 using training samples from one or more other software products different from software product 702, the accuracy of predictions generated by machine learning model 602 with respect to software product 702 may be further improved, since machine learning model 602 may be able to learn other factors that might not be represented by training data from prior versions 704-714 of software product 702, but that might affect defect escalation rates of subsequent versions of software product 702. For example, in some cases, training machine learning model 602 using training samples from multiple different software products may allow for transfer of information across these software products.

Current version 734 of software product may be associated with deferred software defects 736, targeted software defects 740, and untargeted software defects 744. Deferred software defects 736, targeted software defects 740, and untargeted software defects 744 may be associated with attribute values 738, 742, and 746, respectively. Software defects 610-640 may include software defects selected from one or more of deferred software defects 736, targeted software defects 740, and/or untargeted software defects 744.

Deferred software defects 736 may include software defects that have not been resolved before release of a prior version (e.g., 714) of software product 702, and have instead been deferred to be resolved prior to release of current version 734 of software product 702. Targeted software defects 740 may include software defects that have been introduced in current version 734 of software product 702 (e.g., after release of the prior version), and are planned to be resolved prior to release of current version 734 of software product 702. Untargeted software defects 744 may include software defects that have been introduced in a prior version (e.g., 714) or current version 734 of software product 702, and that are not planned to be resolved prior to release of current version 734 of software product 702. Thus, defects 736, 740, and 744 may include any software defect known to be present in software product 702, regardless of when it was introduced and/or whether it is planned to be resolved.

In some implementations, machine learning model 602 may generate escalation values that suggest a resolution priority for one or more of the defects in current version 734 that differs from a manually-assigned resolution priority. For example, machine learning model 602 may determine that one or more of untargeted software defects 744 are likely to be escalated, and should therefore be targeted for resolution before release of current version 734. As another example, machine learning model 602 may determine that one or more of targeted software defects 740 are unlikely to be escalated, and may therefore be deferred for resolution until after the release of current version 734. Thus, training machine learning model 602 using training data 700, and subsequently applying the trained machine learning model 602 to inference data 730, may allow for more accurate determinations of software defects severity, and may thus decrease the number of post-release defect escalations.

VIII. EXAMPLE OPERATIONS

Figure 8:
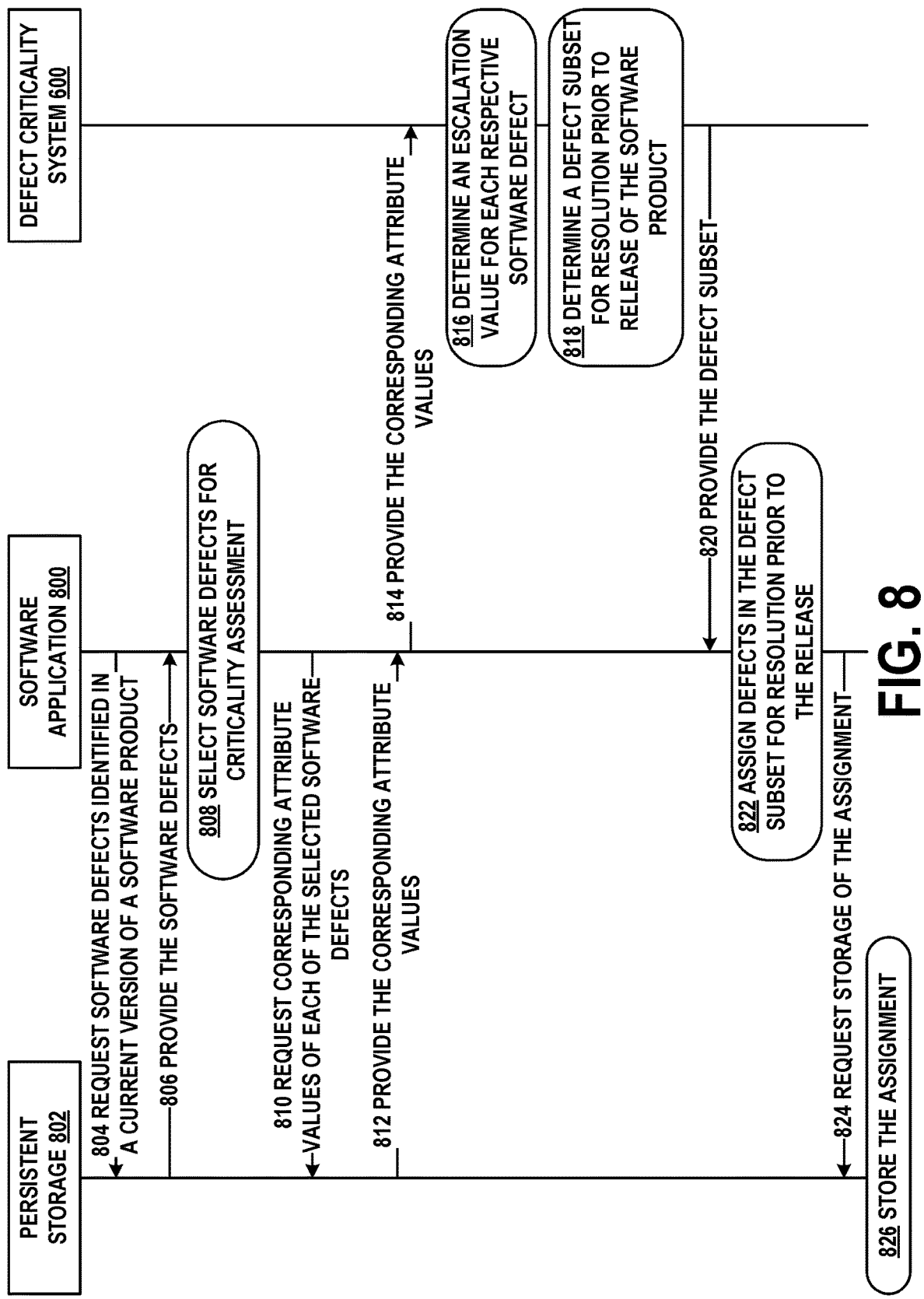
FIG. 8 depicts a message flow diagram, in accordance with example embodiments.

FIG. 8 illustrates a message flow diagram of operations related to using a machine learning model to automatically assess the criticality of identified software defects. Specifically, FIG. 8 includes software application 800, persistent storage 802, and defect criticality system 600. Each of software application 800, persistent storage 802, and defect criticality system 600 may be disposed in managed network 300 and/or remote network management platform 320.

Persistent storage 802 may be configured to store records associated with software defects, and may thus include one or more databases utilized during the software development process to assist with developing the software product and/or resolving the software defects. For example, persistent storage 802 may be configured to store training data 700 and inference data 730 (including software defects 610-640).

Software application 800 may be configured to facilitate user interaction with defect criticality system 600. For example, software application 800 may be configured to provide one or more interfaces that provide for user control of defect criticality system 600, display outputs generated by defect criticality system 600, and/or facilitate the process of resolving the software defects. In some implementations, defect criticality system 600 may form a subset of software application 800. Alternatively, software application 800 may form a subset of defect criticality system 600, or software application 800 and defect criticality system 600 may be two separate components of a software defect resolution architecture and/or system.

Software application 800 may be configured to request, from persistent storage 802, software defects identified in a current version of a software product, as indicated by arrow 804. For example, the request at arrow 804 may be transmitted based on and/or in response to a manual request by a user, and/or a determination that a particular milestone (e.g., completion of testing) has been reached in the development process of the current version of the software product, among other possibilities. Based on and/or in response to reception of the request at arrow 804, persistent storage 802 may be configured to retrieve and provide data representing the software defects, as indicated by arrow 806. The data may include, for example, deferred software defects 736, targeted software defects 740, and/or untargeted software defects 744.

Based on and/or in response to reception of the software defects at arrow 806, software application 800 may be configured to select software defects for criticality assessment, as indicated by block 808. In one example, the software defects may be selected (e.g., by a software developer and/or tester) by way of a user interface provided by software application 800. For example, the software defects may be selected explicitly (e.g., by selecting the software defects to be processed by defect criticality system 600) or implicitly (e.g., by selecting software defects that are manually designated for resolution, with any non-designated software defects to be processed by defect criticality system 600). In another example, the software defects may be selected automatically by software application 800 based on types and/or classes of the software defects received at arrow 806. For example, some types/classes of defects (e.g., security defects) may be escalated for resolution automatically and independently of processing by defect criticality system 600.

Based on and/or in response to selection of the software defects for criticality assessment at block 808, software application 800 may be configured to request corresponding attribute values of each respective software defect of the selected software defects, as indicated by arrow 810. Based on and/or in response to reception of the request at arrow 810, persistent storage 802 may be configured to retrieve and provide the corresponding attribute values, as indicated by arrow 812. The corresponding attribute values may include values for attributes based on which defect criticality system 600 has been trained. The corresponding attribute values may be retrieved from a plurality of different databases and/or systems, including a software defect tracking database and/or system, a source code database and/or system, a database and/or system used by software developers/testers for communicating with one another, a software product configuration database and/or system, and/or a database and/or system used to track progress in development and/or testing of the software product, among other possibilities.

Based on and/or in response to obtaining the corresponding attribute values at arrow 812, software application 800 may be configured to provide the corresponding attribute values to defect criticality system 600, as indicated by arrow 814. Based on and/or in response to reception of the corresponding attribute values at arrow 814, defect criticality system 600 may be configured to determine an escalation value for each respective software defect for which corresponding attribute values are provided, as indicated by block 816. Based on and/or in response to determining the escalation values at block 816, defect criticality system 600 may be configured to determine a defect subset for resolution prior to release of the software product, as indicated by block 818.

For example, corresponding attribute values at arrow 814 may represent the corresponding attribute values of software defects 610-640, the escalation values determined at block 816 may represent escalation values 604-605, and the defect subset determined at block 818 may represent defect subset 650, as shown in and discussed with respect to FIG. 6. Accordingly, in some implementations, the defect subset determined at block 818 may include a ranked list of at least some of the software defects selected at block 808, and may thus indicate an order in which to attempt to resolve the selected software defects.

Based on and/or in response to determination of the defect subset at block 818, defect criticality system 600 may be configured to provide the defect subset to software application 800, as indicated by arrow 820. Based on and/or in response to reception of the defect subset at arrow 820, software application 800 may be configured to assign defects in the defect subset for resolution prior to the release of the software product, as indicated by block 822. For example, defects in the subset may be assigned manually and/or automatically to one or more software developers that are expected to attempt to resolve these defects. In implementations where the defect subset indicates a ranking of the software defects, the defects may be assigned starting with a most critical defect and moving towards a least critical defect.

Based on and/or in response to assignment of the defects at block 822, software application 800 may be configured to transmit, to persistent storage 802, a request to store the assignment, as indicated by arrow 824. Based on and/or in response to reception of the request at arrow 824, persistent storage 802 may be configured to store the assignment, as indicated by block 826. Storage of the assignment at block 826 may allow each respective software developer to view, using one or more user interfaces (e.g., of software application 800), software defects that have been assigned to the respective software developer for resolution.

IX. ADDITIONAL EXAMPLE OPERATIONS

Figure 9:
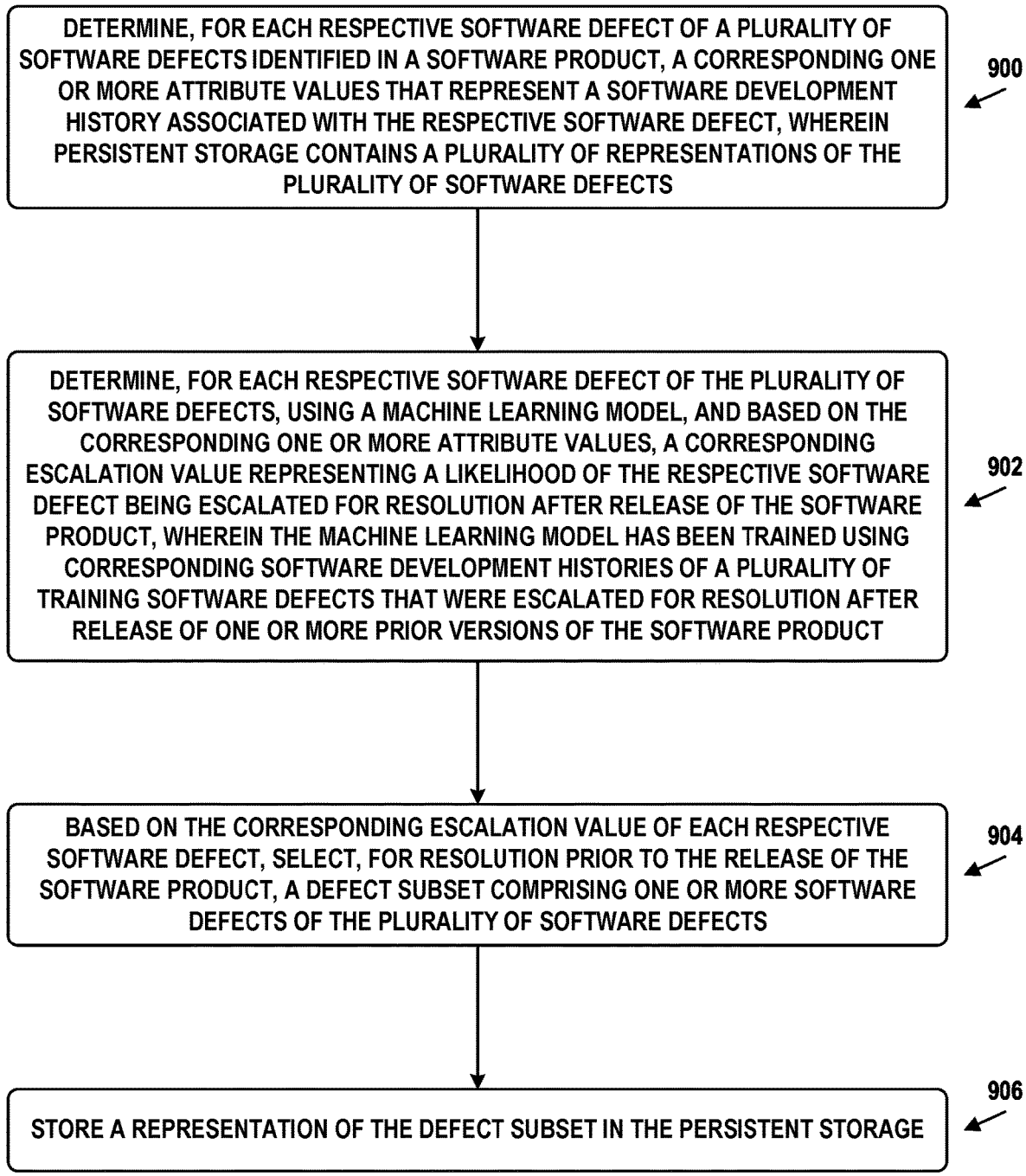
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a computational instance of a remote network management platform, a portable computer, such as a laptop or a tablet device, defect criticality system 600, and/or software application 800.

The embodiments of FIG. 9 may be simplified by the removal of any one or more of the features shown therein. Further, these embodiments may be combined with features, aspects, and/or implementations of any of the previous figures or otherwise described herein.

Block 900 may involve determining, for each respective software defect of a plurality of software defects identified in a software product, a corresponding one or more attribute values that represent a software development history associated with the respective software defect. Persistent storage may contain a plurality of representations of the plurality of software defects.

Block 902 may involve determining, for each respective software defect of the plurality of software defects, using a machine learning model, and based on the corresponding one or more attribute values, a corresponding escalation value representing a likelihood of the respective software defect being escalated for resolution after release of the software product. The machine learning model may have been trained using corresponding software development histories of a plurality of training software defects that were escalated for resolution after release of one or more prior versions of the software product.

Block 904 may involve, based on the corresponding escalation value of each respective software defect, selecting, for resolution prior to the release of the software product, a defect subset comprising one or more software defects of the plurality of software defects.

Block 906 may involve storing a representation of the defect subset in the persistent storage.

In some embodiments, selecting the defect subset may include determining, based on the corresponding escalation value of each respective software defect, an order in which to resolve the one or more software defects prior to the release. The representation of the defect subset stored in the persistent storage may indicate the order.

In some embodiments, the representation of the defect subset may be transmitted to a computing device associated with a software developer.

In some embodiments, each respective software defect of the plurality of software defects may be contained in a corresponding feature of the software product.

In some embodiments, the software development history may be associated with developing the corresponding feature of the software product.

In some embodiments, the software development history may include an attempted resolution history associated with attempted resolutions to the respective software defect in the corresponding feature of the software product.

In some embodiments, the corresponding one or more attribute values may include a number of lines of code that have been added to or modified in the corresponding feature of the software product.

In some embodiments, the corresponding one or more attribute values may include a number of files that have been added to or modified in the corresponding feature of the software product.

In some embodiments, the corresponding one or more attribute values may include a number of revision control commits that have been made in the corresponding feature of the software product.

In some embodiments, the corresponding one or more attribute values may include information about software plugins utilized by the corresponding feature of the software product.

In some embodiments, the corresponding one or more attribute values may include information about a product area to which the corresponding feature of the software product belongs.

In some embodiments, the corresponding one or more attribute values may include textual data that describes one or more of: (i) the respective software defect, or (ii) the corresponding feature of the software product.

In some embodiments, the corresponding one or more attribute values may include textual data contained in comments included in source code defining the corresponding feature of the software product.

In some embodiments, the corresponding one or more attribute values may include identities of software developers associated with the corresponding feature of the software product.

In some embodiments, a training process for the machine learning model may include obtaining a plurality of training samples. The training samples may include (i) the plurality of training software defects and (ii) a second plurality of training software defects that were not escalated for resolution after release of the one or more prior versions of the software product. The training process may also include determining, for each respective training sample of the plurality of training samples, a corresponding one or more training attribute values that represent a corresponding software development history associated with the respective training sample. The training process may additionally include determining, for each respective training sample of the plurality of training samples, using the machine learning model, and based on the corresponding one or more training attribute values, a corresponding training escalation value. The training process may further include determining, using a loss function, a loss value based on (i) a determination of whether the respective training sample has been escalated for resolution and (ii) the corresponding training escalation value of the respective training sample. The training process may yet further include updating one or more parameters of the machine learning model based on the loss value.

In some embodiments, the plurality of training samples may include software defects that were identified in a second software product that is different from the software product.

X. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
persistent storage containing a plurality of representations of a plurality of software defects identified in a software product; and
one or more processors configured to perform operations comprising:
determining, for each respective software defect of the plurality of software defects, corresponding one or more attribute values that represent a software development history associated with the respective software defect;
determining, for each respective software defect of the plurality of software defects, using a machine learning model, and based on the corresponding one or more attribute values, a corresponding escalation value representing a likelihood of the respective software defect being escalated for resolution after release of the software product, wherein the machine learning model has been trained using corresponding software development histories of a plurality of training software defects that were escalated for resolution after release of one or more prior versions of the software product;
based on the corresponding escalation value of each respective software defect, selecting, for resolution prior to the release of the software product, a defect subset comprising one or more software defects of the plurality of software defects;
storing a representation of the defect subset in the persistent storage; and
resolving, prior to release of the software product, at least one software defect of the one or more software defects of the defect subset.

2. The system of claim 1, wherein selecting the defect subset comprises:
determining, based on the corresponding escalation value of each respective software defect, an order in which to resolve the one or more software defects prior to the release, wherein the representation of the defect subset stored in the persistent storage indicates the order.

3. The system of claim 1, wherein resolving the at least one software defect comprises:
transmitting the representation of the defect subset to a computing device associated with a software developer;
obtaining, from the computing device associated with the software developer, at least one resolution for the at least one software defect; and
applying the at least one resolution to the software product.

4. The system of claim 1, wherein each respective software defect of the plurality of software defects is contained in a corresponding feature of the software product.

5. The system of claim 4, wherein the software development history is associated with developing the corresponding feature of the software product.

6. The system of claim 4, wherein the software development history comprises an attempted resolution history associated with attempted resolutions to the respective software defect in the corresponding feature of the software product.

7. The system of claim 4, wherein the corresponding one or more attribute values comprise at least one of: (i) a number of lines of code that have been added to or modified in the corresponding feature of the software product or (ii) a number of files that have been added to or modified in the corresponding feature of the software product.

8. The system of claim 4, wherein the corresponding one or more attribute values comprise a number of revision control commits that have been made in the corresponding feature of the software product.

9. The system of claim 4, wherein the corresponding one or more attribute values comprise information about software plugins utilized by the corresponding feature of the software product.

10. The system of claim 4, wherein the corresponding one or more attribute values comprise information about a product area to which the corresponding feature of the software product belongs.

11. The system of claim 4, wherein the corresponding one or more attribute values comprise textual data that describes one or more of: (i) the respective software defect, or (ii) the corresponding feature of the software product.

12. The system of claim 4, wherein the corresponding one or more attribute values comprise textual data contained in comments included in source code defining the corresponding feature of the software product.

13. The system of claim 4, wherein the corresponding one or more attribute values comprise identities of software developers associated with the corresponding feature of the software product.

14. The system of claim 1, wherein the operations further comprise a training process for the machine learning model, and wherein the training process comprises:

obtaining a plurality of training samples comprising (i) the plurality of training software defects and (ii) a second plurality of training software defects that were not escalated for resolution after release of the one or more prior versions of the software product;

determining, for each respective training sample of the plurality of training samples, corresponding one or more training attribute values that represent a corresponding software development history associated with the respective training sample;

determining, for each respective training sample of the plurality of training samples, using the machine learning model, and based on the corresponding one or more training attribute values, a corresponding training escalation value;

determining, using a loss function, a loss value based on (i) a determination of whether the respective training sample has been escalated for resolution and (ii) the corresponding training escalation value of the respective training sample; and updating one or more parameters of the machine learning model based on the loss value.

15. The system of claim 14, wherein the plurality of training samples comprises software defects that were identified in a second software product that is different from the software product.

16. A computer-implemented method comprising:

determining, for each respective software defect of a plurality of software defects identified in a software product, corresponding one or more attribute values that represent a software development history associated with the respective software defect, wherein persistent storage contains a plurality of representations of the plurality of software defects;

determining, for each respective software defect of the plurality of software defects, using a machine learning model, and based on the corresponding one or more attribute values, a corresponding escalation value representing a likelihood of the respective software defect being escalated for resolution after release of the software product, wherein the machine learning model has been trained using corresponding software development histories of a plurality of training software defects that were escalated for resolution after release of one or more prior versions of the software product;

based on the corresponding escalation value of each respective software defect, selecting, for resolution prior to the release of the software product, a defect subset comprising one or more software defects of the plurality of software defects;

storing a representation of the defect subset in the persistent storage; and resolving, prior to release of the software product, at least one software defect of the one or more software defects of the defect subset.

17. The computer-implemented method of claim 16, wherein selecting the defect subset comprises:

determining, based on the corresponding escalation value of each respective software defect, an order in which to resolve the one or more software defects prior to the release, wherein the representation of the defect subset stored in the persistent storage indicates the order.

18. The computer-implemented method of claim 16, wherein each respective software defect of the plurality of software defects is contained in a corresponding feature of the software product, and wherein the corresponding one or more attribute values comprise one or more of: (i) a number of lines of code that have been added to or modified in the corresponding feature of the software product, (ii) a number of files that have been added to or modified in the corresponding feature of the software product, (iii) a number of revision control commits that have been made in the corresponding feature of the software product, (iv) information about software plugins utilized by the corresponding feature of the software product, (v) information about a product area to which the corresponding feature of the software product belongs, (vi) textual data that describes the respective software defect, (vii) textual data that describes the corresponding feature of the software product, (viii) textual data contained in comments included in source code defining the corresponding feature of the software product, or (ix) identities of software developers associated with the corresponding feature of the software product.

19. An article of manufacture including a non-transitory computer-readable medium, having stored thereon program instructions that, upon execution by a computing system, cause the computing system to perform operations comprising:

determining, for each respective software defect of a plurality of software defects identified in a software product, corresponding one or more attribute values that represent a software development history associated with the respective software defect, wherein persistent storage contains a plurality of representations of the plurality of software defects;

determining, for each respective software defect of the plurality of software defects, using a machine learning model, and based on the corresponding one or more attribute values, a corresponding escalation value representing a likelihood of the respective software defect being escalated for resolution after release of the software product, wherein the machine learning model has been trained using corresponding software development histories of a plurality of training software defects that were escalated for resolution after release of one or more prior versions of the software product;

based on the corresponding escalation value of each respective software defect, selecting, for resolution prior to the release of the software product, a defect subset comprising one or more software defects of the plurality of software defects;

storing a representation of the defect subset in the persistent storage; and resolving, prior to release of the software product, at least one software defect of the one or more software defects of the defect subset.

20. The system of claim 3, wherein resolving the at least one software defect comprises:

assigning the one or more software defects of the defect subset for resolution by the software developer, wherein the representation of the defect subset is transmitted to the computing device based on assigning the one or more software defects of the defect subset for resolution by the software developer, wherein reception of the representation of the defect subset causes a user interface of the computing device to display the one or more software defects assigned to the software developer, and wherein the at least one resolution is obtained from the computing device by way of the user interface.

* * * * *